United States Patent [19]
Pelton

[11] Patent Number: 5,857,760
[45] Date of Patent: Jan. 12, 1999

[54] ILLUMINATED BALLOON APPARATUS AND METHOD

[75] Inventor: Bruce A. Pelton, El Sobrante, Calif.

[73] Assignee: Lumatech Corporation, Emeryville, Calif.

[21] Appl. No.: 564,407

[22] Filed: Nov. 29, 1995

[51] Int. Cl.[6] ........................................................ F21V 8/00
[52] U.S. Cl. ............................ 362/32; 362/62; 362/96; 362/253; 362/386; 362/391; 362/806; 244/33
[58] Field of Search ................................. 362/32, 62, 96, 362/234, 253, 363, 386, 391, 806; 244/33; 116/210

[56] References Cited

U.S. PATENT DOCUMENTS

| | | | |
|---|---|---|---|
| 3,592,157 | 7/1971 | Schwartz | 362/62 X |
| 4,416,433 | 11/1983 | Bellina | 244/33 |
| 4,542,445 | 9/1985 | Marletta | 362/96 |
| 4,586,456 | 5/1986 | Forward | 116/210 |
| 4,787,575 | 11/1988 | Stewart | 244/33 |
| 5,155,470 | 10/1992 | Tuttle | 340/539 |
| 5,262,768 | 11/1993 | Florer | 340/815.73 |

*Primary Examiner*—Stephen F. Husar
*Attorney, Agent, or Firm*—Marger, Johnson, McCollam & Stolowitz, P.C.

[57] ABSTRACT

Disclosed herein is a method and device which provides for the capability of functional illumination by a balloon. This invention includes one or more fiber optic elements within a balloon which are configured to disperse substantial light at its (their) ends. This invention further provides for reliable retraction of signal or illumination balloons during hazardous wind conditions by including a sensor for detecting the presence of such conditions, and providing for retraction of the balloon via its tether, wherein such retraction is either under operator control or automatic.

20 Claims, 7 Drawing Sheets

FIG.10

ILLUMINATED BALLOON APPARATUS AND METHOD

FIELD OF THE INVENTION

This invention relates to illuminated balloons, and more particularly pertains to balloons illuminated with fiber optics in a manner which produces diffused light.

BACKGROUND OF THE INVENTION

Balloons are used for many purposes. One of the most common uses is as a decorative item. Balloons are also used as signal devices, aiding rescuers in locating victims who are lost at sea or in the woods, for example. Illuminating a balloon from the inside or the outside will add to its decorative characteristics or will make it easier to spot from a distance. The prior art addresses the need for illuminated signal balloons.

In the prior art, a light is incorporated into a balloon, either powered by batteries carried aloft or by an external power source connected to the balloon by wires. U.S. Pat. No. 4,586,456 issued to Forward describes an illuminated balloon wherein the illumination is provided by a flashlight carried in a specially designed balloon. This approach requires a balloon large enough to carry aloft the batteries powering the light source as well as the light source itself. The need of the balloon to support the weight of the batteries is mitigated in U.S. Pat. No. 4,542,445 issued to Marletta, in which the power supply for the light is separate from the balloon, the two being connected by a power cord.

Situating the light source inside the balloon is problematic because it generally produces heat as well as light. The current technology consists of multiple incandescent sources housed within the balloon and powered from the ground by a cable which also serves as a tether. These sources are extremely inefficient operating at an average of around 20 Lumens/Watt. These sources also require extensive power and thermal management devices because of the high power levels they require. The excess heat generated affects the gas inside the balloon, increasing the pressure on the inner surface of the skin of the balloon. It may also affect the balloon skin itself and other components within the balloon.

Moreover, a power cord itself presents a significant danger due to the impressed voltage and the current supplied by the power source. For example, during moderate to extreme wind conditions, the power cord could come into contact with combustible materials, or with people such as a rescuer or the victim, posing an inherent risk of fire or electric shock.

The problem of heat generated within the balloon, and the danger presented by a power cord, can both be circumvented through the use of fiber optic materials to deliver light from an external source to the interior of the balloon, whence it can be dispersed to provide effective illumination. U.S. Pat. No. 5,166,470 issued to Tuttle and U.S. Pat. No. 4,787,575 issued to Stewart incorporate fiber optics to reduce the weight carried by the balloon. Stewart's disclosure shows that the fibers may be "splayed" to disperse light. This directed light, which is directed to the inside of the balloon, is dispersed by the balloon itself in the Stewart disclosure. Thus, in the Stewart invention, the balloon is limited in that its skin cannot be transparent, since it must scatter light incident on it from an optic fiber.

If sufficient light were dispersed in an effective manner, illuminated balloons using fiber optic technology could also provide functional illumination as well as merely decorative illumination. The remote arrangement would allow the energy consuming portion of the system to remain on the ground where weight, heat, control and shock are not issues. This would expand application of the illuminated balloons to hazardous environments including the interior of petroleum storage tanks, crash sites 30 or flammable material leaks. Thus it is desirable to provide a manner in which to disperse light from optical fibers used in an illuminated balloon.

When a lighter-than-air balloon is used for functional illumination, it is occasionally necessary to reel in the balloon's tether, as for example, when winds arise of greater strength than 2 to 3 on the Beaufort scale. Therefore, even with a safe, effective means to illuminate the balloon, it would be further beneficial to have the balloon retractable in windy conditions.

U.S. Pat. No. 4,416,433 issued to Bellina describes a retractable tether in combination with a signal balloon. In that reference, it is up to the user to determine whether the balloon should be retracted. It is also up to the user to effect the retraction. This system requires the user's constant attention to the balloon's circumstances which is arguably a waste of time. Thus, it would be beneficial to automatically sense wind conditions to alert the user to the need for retraction of the tether; however, it would also be beneficial for such retraction to take place automatically, if desired by the user.

SUMMARY OF THE INVENTION

The method and device of this invention includes one or more fiber optic elements within a balloon which are configured to disperse light at its (their) ends and thus provide the capability for functional illumination by the balloon. This invention provides for reliable retraction of signal or illumination balloons during hazardous wind conditions by including a sensor for detecting the presence of such conditions, and providing for retraction of the balloon via its tether, wherein such retraction is either under operator control or automatic.

DETAILED DESCRIPTION OF THE INVENTION

As discussed above, this invention includes one or more elements within a balloon which are configured to disperse light at its (their) ends. The optical fiber is of a type which can be purchased from, for example, Optical Cable Corporation of Dallas, Tex., and depending on the light dispersal technique used in accordance with this invention, is of any suitable type. Preferably it is strong enough to withstand repeated sudden changes in tension and other stresses caused by varying wind conditions and retraction. The use of optical fiber for illumination and dispersal of its light (discussed in detail below) is particularly advantageous for illuminated balloons because it does not generate heat (which affects balloon components, including the gas inside the balloon) and if toppled by wind, does not carry voltage capable of causing fires or electric shocks.

Figure 1:
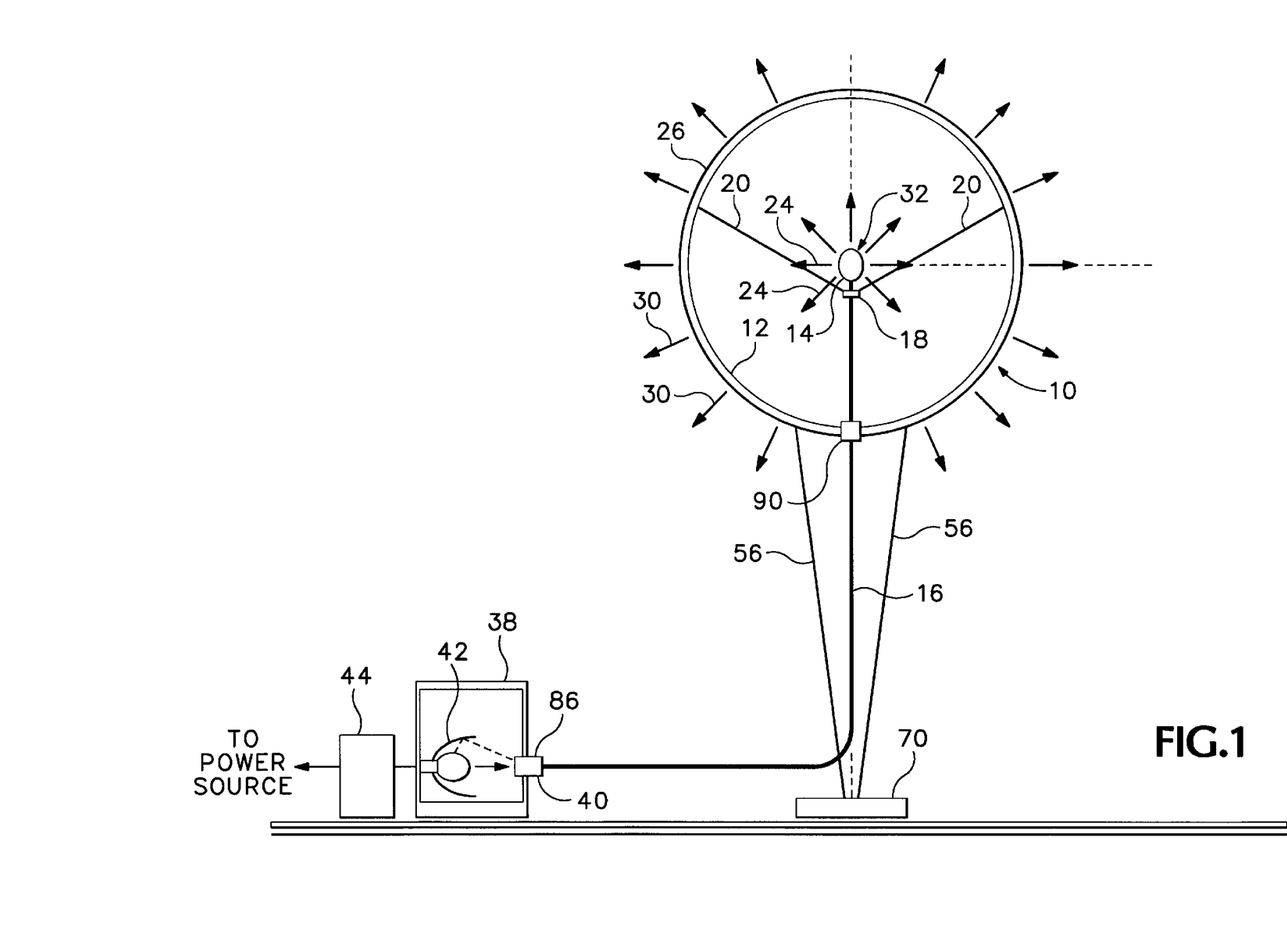
FIG. 1 shows a tethered balloon, with the illumination source connected to the light dispersal element within the balloon by a fiber optic cable.

Referring now to the drawings in more detail, FIG. 1 shows generally a lighting device including a balloon 10 which is a helium (or other lighter-than-air gas) filled structure. The inside surface 12 of the balloon 10 in one embodiment supports one end 14 of a fiber optic cable 16 by means of a support ring 18 encircling the fiber optic cable 16 close to its terminal end 14 and attached to internal support cables 20 fixed to the inner surface 12 of the balloon 10 providing the ability to support the light on the inside of the balloon. In addition the fiber optic cable 16 is restrained at its entry to the balloon by the restraint 90. The end 14 of the fiber optic cable 16 is configured o disperse light and act as primary emitter 32. Arrows 24 show dispersal of the light from the primary emitter 32 at the end 14 of fiber optic cable 16. The surface 26 of the balloon 10 further diffuses the light and acts as a secondary emitter (depending on the balloon's material). Arrows 30 show dispersal of the light from the surface 26 of the balloon 10.

The end 14 of the fiber optic cable 16 can be configured as a primary emitter in any suitable manner. For example, end 14 is a generally convex primary emitter 32 shown in FIG. 1 and is formed by fusing singly or multiply stranded fiber optic cable. Fusing can be accomplished in any suitable manner, such as bonding a plurality of fibers together with an adhesive like epoxy. Preferably, the adhesive has optical properties which will aid in light disperal. On the other hand, since an optical fiber typically has an outer cladding of teflon which has a very high melting point, applying heat directly to the fiber to fuse it with an adjacent fiber portion could change the optical properties of the fiber in either a desirable manner or an undesirable manner.

Figure 2:
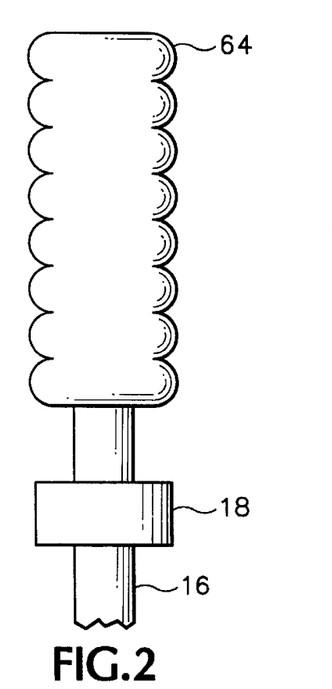
FIG. 2 shows an alternative light dispersal element for use within the balloon.

In a different embodiment, the primary emitter is a generally convex piece of transparent material, whose surface is etched [frosted, ground] to promote diffusion of light, and which is optically coupled to the end 14 of the fiber optic cable 16. A "generally convex" primary emitter includes not only spherical and ovoid shaped primary emitters, but also any primary emitter wherein a portion thereof is convex, even if its surface is substantially corrugated or otherwise irregular, as is the primary emitter 64 shown in FIG. 2.

Figure 3:
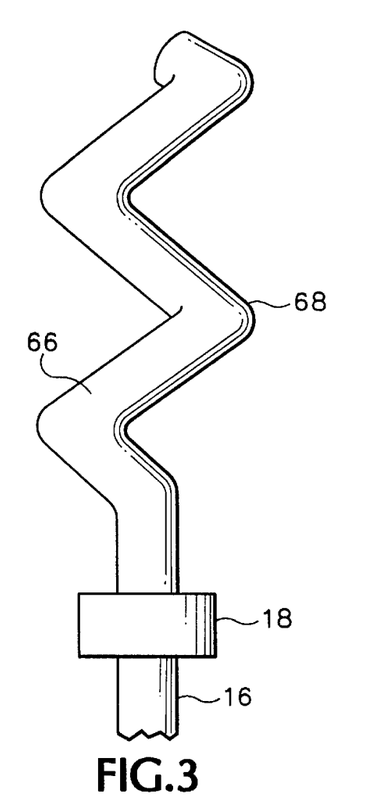
FIG. 3 shows a helical emitter element for use within the balloon.

A helical primary emitter 66 is shown in FIG. 3. Its surface 68 is etched, frosted, or ground to disperse light. Other configurations of a primary emitter to achieve the same end are within the scope of this invention.

Figure 4:
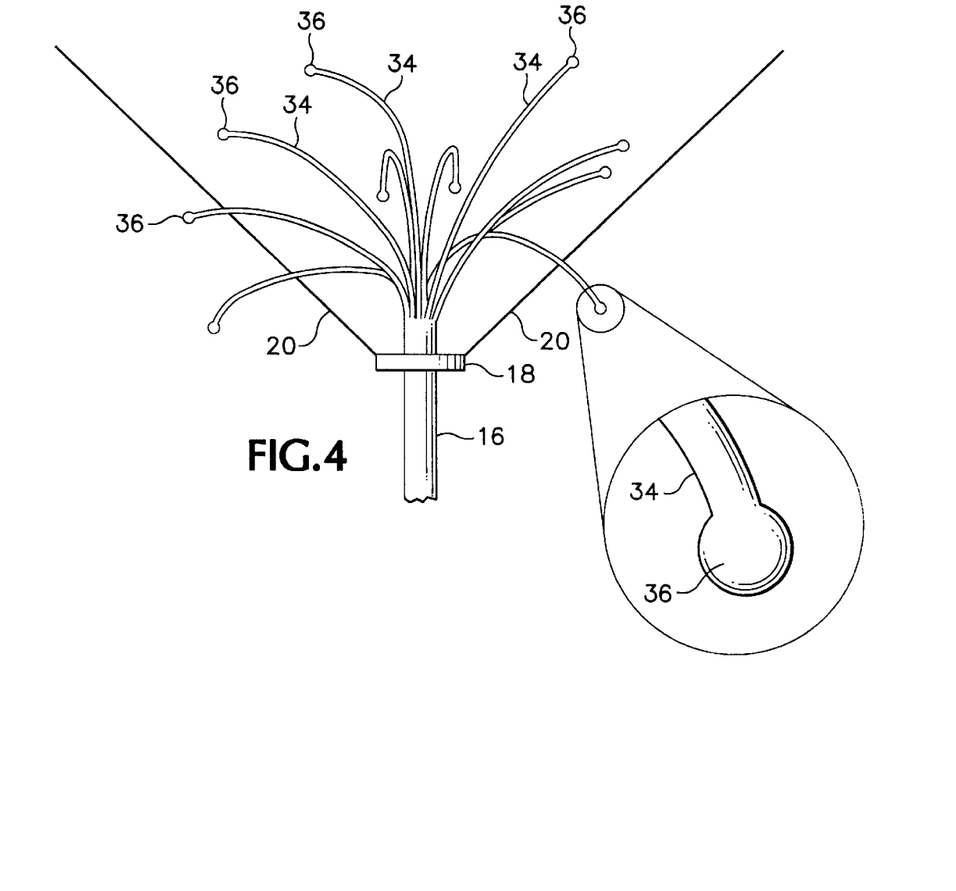
FIG. 4 shows an alternative light dispersal element for use inside the balloon.

Yet another embodiment of the light dispersal element described in connection with FIG. 1 is shown in FIG. 4. In this embodiment, the fiber optic cable 16 ends in a plurality of fiber optic strands 34, each of which ends in a dispersal element 36. Each of the individual dispersal elements 36 is a transparent nodule whose surface is etched, ground, or frosted to promote diffusion of light; alternatively, the terminal end of each strand acts as a lens to generally project the light from a strand 34 against the inner surface 12 of the balloon 10 which, as mentioned above, then further disperses the light. In this embodiment, the fiber optic cable 16 is multi-stranded, and the primary emitter strands 34 are contiguous with the strands comprising the fiber optic cable 16. In another embodiment, the multi-stranded primary emitter is a separately fashioned unit, optically coupled to the end 14 of the fiber optic cable 16. In this latter embodiment, the fiber optic cable 16 could be singly-stranded or multi-stranded.

The light is conducted along the cable from the light source 38 (see FIG. 1) which acts in communication with the end 40 of the fiber optic cable 16. In a first embodiment, the fiber optic cable 16 acts as a tether. In another embodiment, one or more security cables 56 secure the balloon 10 to its base 70, for stability. In some applications the fiber optic cable 16 alone could serve as tether. It is preferable in that case that the fiber optic cable 16 be sheathed for strength, with both cable and sheath restrained at their entry to the balloon by the restraint 90.

Figure 5:
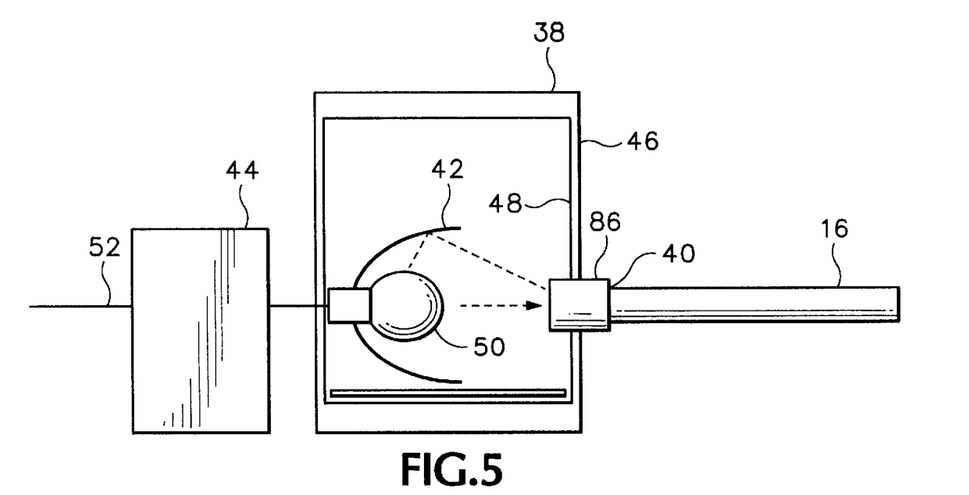
FIG. 5 shows a light source—fiber coupling system.

The end 40 of the fiber optic cable 16 is optically coupled to a light source 38 with a concentrator 42. The light source 38 is powered by the power supply 44. FIG. 5 shows the light source—fiber optic coupling system in greater detail. To avoid twisting of the optical fiber upon retraction, which is discussed in detail below, the end of the fiber optic cable is rotatably connected 86 to the light source housing 46. The housing 46 is a light-tight box with a highly reflective inner surface 48. Efficient distribution of the light to the end 40 of the fiber optic cable 16 is guaranteed by employing a concentrator 42, as shown. The concentrator 42 may be a parabolic reflector, or it may be a non-imaging concentrator. Preferably, the light itself is provided by a high intensity light source, such as a gas- or vapor-filled lamp 50; or it is provided by an energy efficient light source, such as a fluorescent, metal halide, or high pressure sodium or sulfur lamp. The power supply 44 shown is provided with a connection 52 to an alternating current distribution system. In another embodiment of this invention, the power for the light source 38 is supplied by one or more batteries, facilitating portable use of this invention.

In any application, such as signalling, decoration, or illumination, it is desirable to provide for retraction of a deployed balloon when wind conditions make deployment hazardous. In an embodiment in which the fiber optic cable does not also serve as the tether, the retraction apparatus preferably separately retracts the optical cable, and the tether cable or cables, to store them without entanglement. Also, the retraction apparatus and method of this invention is used for any type of tether including one which is not part of an illuminated balloon apparatus, as well as one which uses conventional lighting means for illumination of a balloon.

Figure 6:
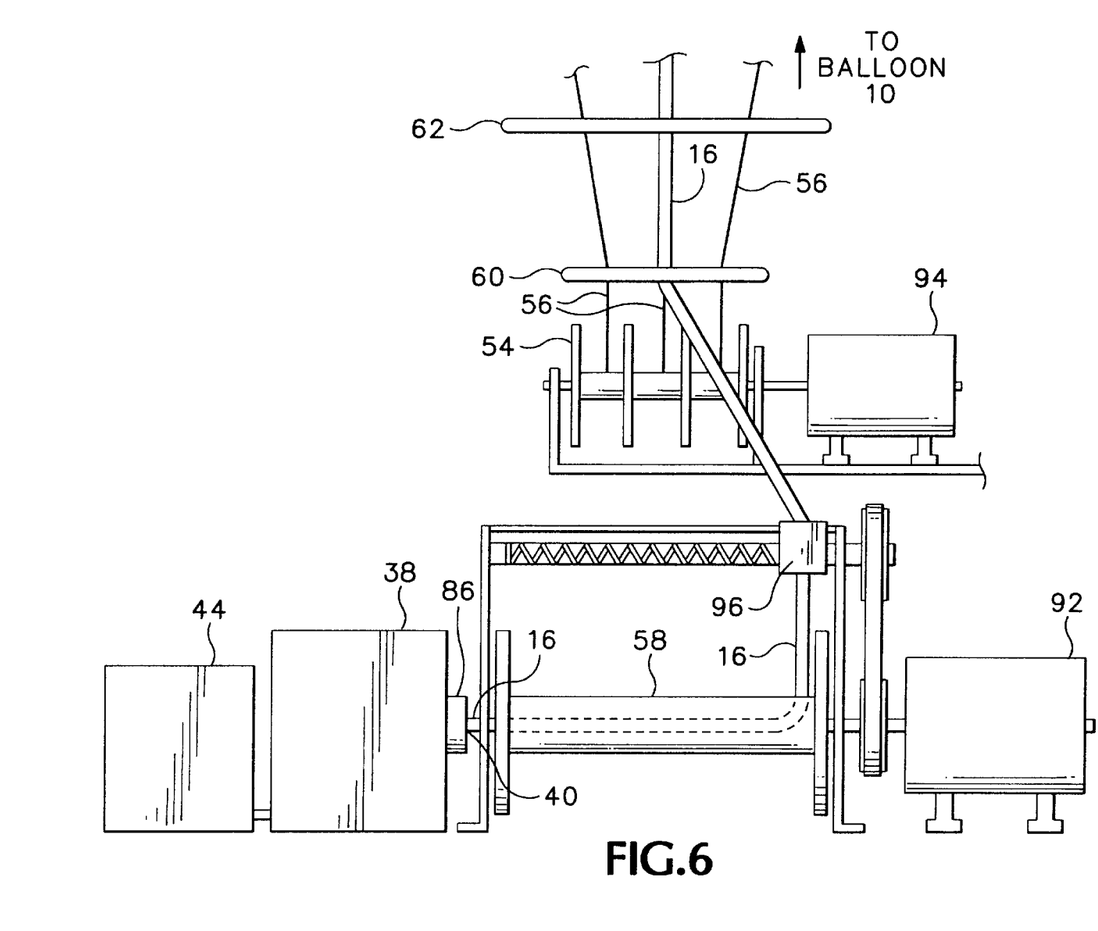
FIG. 6 shows a tethered balloon with sensor and retractor elements.
Figure 7:
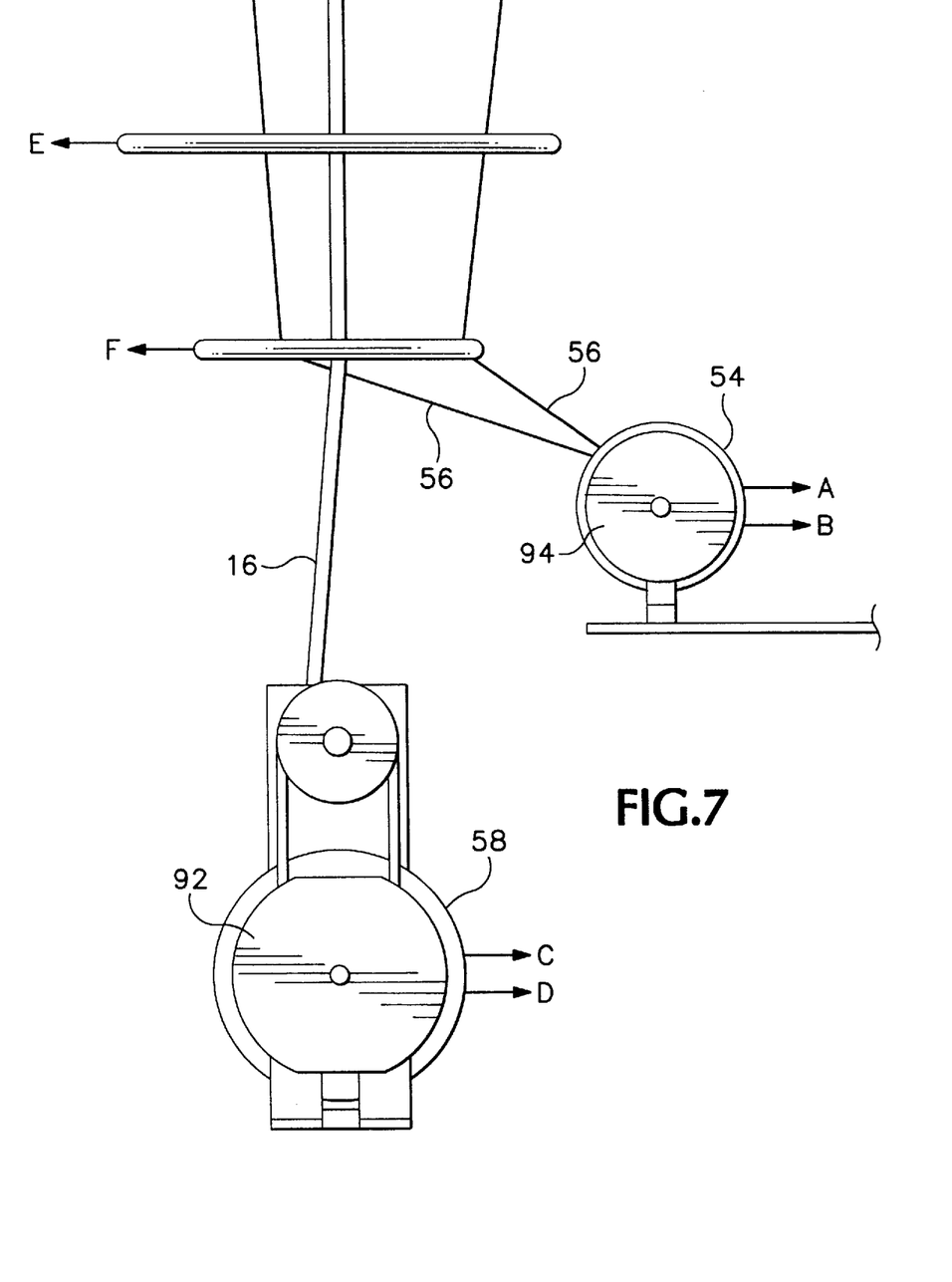
FIG. 7 shows the sensor for hazardous wind conditions in greater detail.

Retraction is effected in one embodiment, as shown in FIG. 6, by providing a ganged take-up spool 54 for the security cables 56, and a separate take-up reel 58 for the fiber optic cable 16. (In FIG. 6 the take-up spool 54 and the take-up reel 58 are shown in an edge-on view. In FIG. 7 for these same elements shown in an end-on view; see below.) However, when the fiber optic cable 16 acts also as tether, then only the take-up reel 58 for the fiber optic cable 16 is needed to provide a means for retracting the balloon 10 to safety. Whether the fiber optic cable 16 also act as tether or not, it is preferable that its end 40 be rotatably connected 86 to the light source housing 46, since every rotation of the take-up reel 58 would otherwise introduce a twist into the fiber optic cable 16, and the resultant stress could shorten the useful life of the fiber optic cable 16. The element 96 ensures smooth winding of the fiber optic cable 16; it is similar to a "level winder" as may be found on fresh-water bait casting reels.

This invention also incorporates a sensor to detect hazardous wind conditions. Referring to FIG. 7, one embodiment of the sensor is shown therein. In this embodiment, the sensor comprises the security cables 56 made of a electrically conductive material and two electrically conductive rings, with the lower ring 60 having a smaller diameter than the upper ring 62. During quiescent wind conditions, the security cables 56 are in electrical contact only with the lower ring 60 and no tether cable makes electrical contact with the upper ring 62. Electrical contact of a tether cable with the upper ring 62 will be made only when winds are present of sufficient strength to push the balloon 10 away from a position directly above the lower ring 60. The strength needed to produce electrical contact depends on the shape and material of balloon 10, the ratio of the diameter of the lower ring 60 to that of the upper ring 62, and the vertical separation between the two rings and between the lower ring 60 and the balloon 10. Hence the threshold for detection can be adjusted by, for example, changing the separation between the upper ring 62 and the lower ring 60. A simple electric circuit incorporating the two rings as circuit elements can thus detect the presence of hazardous wind conditions, essentially by detecting when the balloon 10 has been pushed laterally enough by the wind. Such a circuit can be used to automatically trigger a further circuit which operates motors 92 and 94 to drive the take-up reel 58 and take-up spool 54 for the optical cable 16 and the security cables 56, respectively. In FIG. 7, sensor connections to this circuit are indicated as E and F; motor connections to the circuit are shown as A and B for drive motor 94 and as C and D for drive motor 92.

Figure 8:
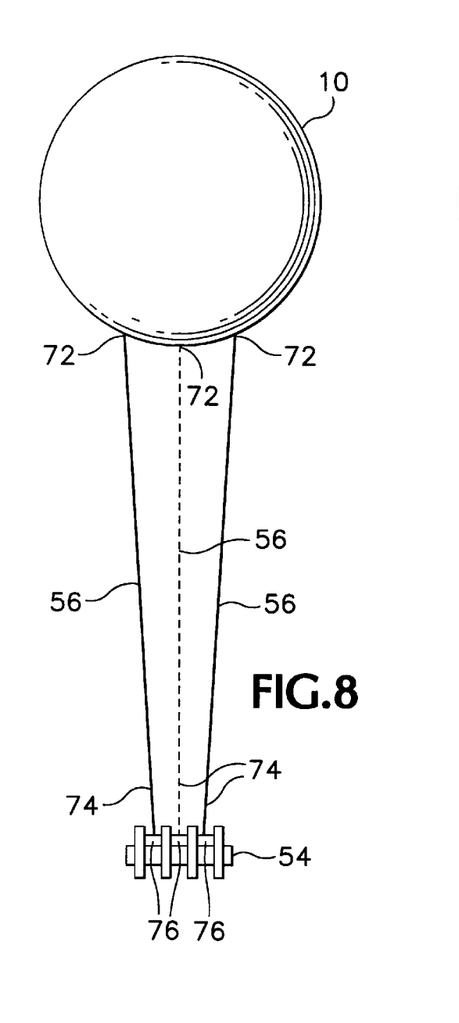
FIG. 8 shows another sensor for detection of hazardous wind conditions.

In another embodiment of this invention, hazardous wind conditions are detected by means of the configuration shown in FIG. 8. The balloon 10 is tethered by at least three security cables 56 whose balloon ends 72 are regularly spaced in a circular arrangement. The base ends 74 are connected to sensors 76 (for example, piezoelectric sensors) mounted on the take-up spool 54 so that, when the balloon 10 is fully deployed, the sensors 76 detect changes in the tension in the tether cables 56. When the difference between the tension at the base ends 74 of any two security cables 56 becomes larger than a predetermined value, the threshold for detection is met and the sensor registers hazardous wind conditions.

Figure 9:
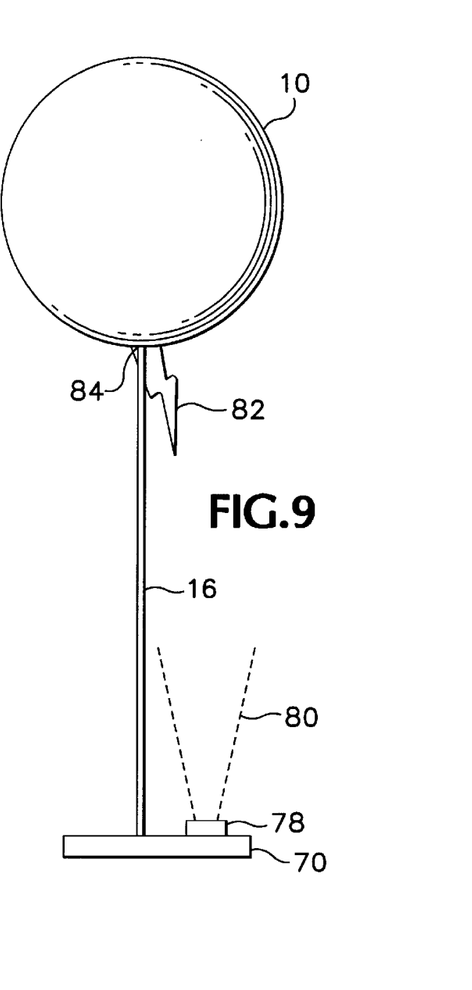
FIG. 9 shows yet another sensor for detection of hazardous wind conditions.

Yet another embodiment of a sensor for hazardous wind conditions is shown in FIG. 9, which shows an infrared or optical detector 78 located in the base 70, with the center of its field of view 80 directed toward the zenith. In FIG. 9, fiber optic cable 16 solely acts a tether. An infrared or optical signal 82 is directed downward from the bottom 84 of the balloon 10. This signal can be produced either by a source carried with the balloon, or, preferable, reflected by a mirror mounted on the bottom of the balloon from a beam produced by a source located on the base 70. In any case, the signal can be coded to prevent interference from background sources of infrared or optical radiation. During hazardous wind conditions, the balloon 10 is pushed laterally, moving the signal 82 out of the field of view 80 of the detector 78, and thus signalling the presence of such conditions. The threshold of detection can be controlled by controlling the field of view of the detector 78.

Figure 10:
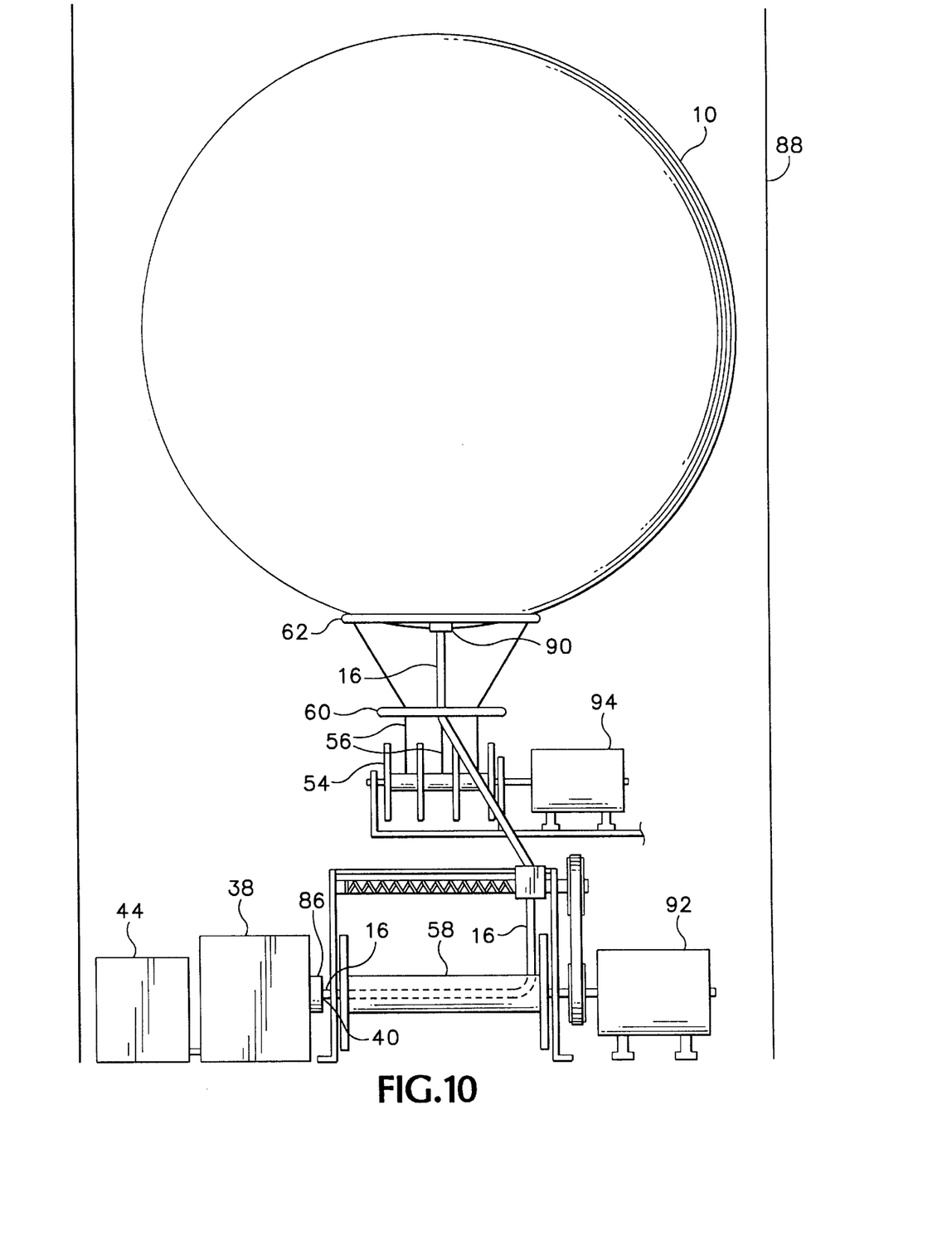
FIG. 10 shows a tethered balloon, with sensor and retractor elements, sheltered within its box prior to deployment or between deployments.

Oftentimes, it is not enough to reel in the security cables and fiber optic cable during hazardous wind conditions. Even with all the cables reeled in and the balloon close to its base, excessive stresses can be created in the cables due to wind pressure on the balloon. These stresses, along with motion of the balloon under influence of the wind, can drastically shorten the life of the cables or damage the balloon or retraction mechanisms. For this reason it is desirable to provide for protecting the balloon and associated elements when not in a deployed state. FIG. 10 shows an embodiment with a box 88, cylindrically shaped, for example, to shelter the balloon 10, light source 38, power supply 44, and retraction elements 54 and 58 when the unit is not deployed. In this embodiment, automatic retraction of the balloon 10 when wind conditions trigger the sensor serves to protect the balloon 10 from damage, and protects the surroundings from possible damage caused by the balloon 10.

The above disclosure has shown several improvements over the prior art of illumination and signal balloons. By utilizing fiber optic technology this invention eliminates the risk of fire and/or electric shock inherent in providing power to an electric light inside a balloon. In another improvement over the prior art, this invention uses an energy efficient light source, comprising perhaps a fluorescent light in combination with a concentrator. This invention also incorporates a sensor for hazardous wind conditions and a retraction apparatus to effect retraction of the balloon when such conditions are present. Additional protection for the retracted balloon, sensor, and retraction apparatus by means of a box (cylindrical in shape, for example) is also shown in this disclosure.

It is not intended that this invention be limited to the exact description contained in this disclosure. Such modifications as are readily apparent to one skilled in the art are also included within the scope of this invention.

What is claimed is:

1. A lighting devic, comprising:
    a balloon having an inside:
    an optical cable, including at least one fiber, to conduct light in a directed manner, said optical cable having a first distal end and a second distal end, said second distal end of said optical cable being configured to cause dispersal of said light and being fused into a fused portion having a substantially convex configuration, said fusing causing said light conducted by said optical fiber to be dispersed at said fused portion, wherein said second distal end is within said inside of said balloon; and
    a lighting source for providing said light to said first distal end of said optical cable.

2. A lighting device as recited in claim 1, wherein said lighting source for providing light to said first distal end of said optical cable is an energy efficient light source.

3. A lighting device as recited in claim 2, said energy efficient lighting source comprising a fluorescent light with a concentrator in communication with said first distal end of said optical cable.

4. A lighting device, comprising:
    a balloon having an inside;
    an optical cable, including at least one fiber, to conduct light in a directed manner, said optical cable having a first distal end and a second distal end, said second distal end configured to cause dispersal of said light, wherein said second distal end is within said inside of said balloon and wherein said second distal end of said optical cable terminates in a substantially convex element, said substantially convex element having an etched surface to facilitate dispersal of said light; and
    a lighting source for providing said light to said first distal end of said optical cable.

5. A lighting device as recited in claim 4 wherein said lighting source for providing light to said first distal end of said optical cable is an energy efficient light source.

6. A lighting device as recited in claim 5, said energy efficient lighting source comprising a fluorescent light with a concentrator in communication with said first distal end of said optical cable.

7. A lighting device, comprising:

a balloon having an inside:

an optical cable, including at least one fiber, to conduct light in a directed manner, said optical cable having a first distal end and a second distal end, said second distal end configured to cause dispersal of said light, wherein said second distal end is within said inside of said balloon and wherein said optical cable contains a plurality of optical fibers, each of said fibers of said plurality terminating at a diffusing element at said second distal end of said optical cable; and a lighting source for providing said light to said first distal end of said optical cable.

8. A lighting device as recited in claim 7 wherein said lighting source for providing light to said first distal end of said optical cable is an energy efficient light source.

9. A lighting device as recited in claim 8, said energy efficient lighting source comprising a fluorescent light with a concentrator in communication with said first distal end of said optical cable.

10. A lighting device, comprising:

a balloon having an inside;

an optical cable, including at least one fiber, to conduct light in a directed manner, said optical cable having a first distal end and a second distal end, said second distal end configured to cause dispersal of said light, wherein said second distal end is within said inside of said balloon; and a lighting source for providing said light to said first distal end of said optical cable;

wherein said lighting source for providing light to said first distal end of said optical cable is an energy efficient light source; and wherein said energy efficient lighting source comprising a fluorescent light with a concentrator in communication with said first distal end of said optical cable.

11. A lighting device, comprising:

a balloon having an inside;

an optical cable, including at least one fiber, to conduct light in a directed manner, said optical cable having a first distal end and a second distal end, said second distal end configured to cause dispersal of said light, wherein said second distal end is within said inside of said balloon;

a lighting source for providing said light to said first distal end of said optical cable, wherein there is a separation between said balloon and said lighting source;

a tether to constrain said separation between said balloon and said lighting source;

a sensor for detecting hazardous wind conditions while said lighting device is in use; and a retractor for retracting said tether when said sensor detects said hazardous wind conditions.

12. A lighting device as recited in claim 11, wherein said separation between said balloon and said lighting source has a vertical separation component and a lateral separation component, and wherein said sensor is responsive to said lateral separation component.

13. A lighting device as recited in claim 11, wherein said optical cable also functions as said tether.

14. A lighting device as recited in claim 11, wherein said retractor operates automatically when said sensor detects said hazardous wind conditions.

15. A balloon illuminating method, comprising the steps of:

providing a balloon having an inside;

providing an optical cable, including at least one fiber, to conduct light in a directed manner, said optical cable having a first distal end an a second distal end, said second distal end configured to cause dispersal of said light, wherein said second distal end is within said inside of said balloon;

providing a lighting source for supplying said light to said first distal end of said optical cable; and fusing said second distal end of said optical cable into a fused portion having a substantially convex configuration, said fusing step causing said light conducted by said optical fiber to be dispersed at said fused portion.

16. A method as recited in claim 15, further comprising the step of providing an energy efficient light source for supplying light to said first distal end of said optical cable.

17. A balloon illuminating method, comprising the steps of:

providing a balloon having an inside;

providing an optical cable, including at least one fiber, to conduct light in a directed manner, said optical cable having a first distal end an a second distal end, said second distal end configured to cause dispersal of said light, wherein said second distal end is within said inside of said balloon;

providing a lighting source for supplying said light to said first distal end of said optical cable wherein there is a separation between said balloon and said lighting source;

providing a tether to constrain said separation between said balloon and said lighting source;

providing a sensor for detecting hazardous wind conditions while said lighting device is in use; and providing a retractor for retracting said tether when said sensor detects said hazardous wind conditions.

18. A method as recited in claim 17, further comprising the step of automatically retracting said tether when said sensor detects said hazardous wind conditions.

19. A method as recited in claim 17 further comprising the step of providing an energy efficient light source for supplying light to said first distal end of said optical cable.

20. A lighting device, comprising:

a balloon having an inside;

an optical cable, including at least one fiber, to conduct light in a directed manner, said optical cable having a first distal end and a second distal end, said second distal end configured to cause dispersal of said light, wherein said second distal end is within said inside of said balloon; and a lighting source for providing said light to said first distal end of said optical cable;

wherein said lighting source for providing light to said first distal end of said optical cable is an energy efficient light source; and wherein said energy efficient lighting source comprising a halide light with a concentrator in communication with said first distal end of said optical cable.

* * * * *